US006508902B2

(12) United States Patent
Lind

(10) Patent No.: US 6,508,902 B2
(45) Date of Patent: Jan. 21, 2003

(54) IN-MOLD EXPANDED CONTENT LABEL AND METHOD FOR APPLYING SAME

(75) Inventor: Brian R. Lind, Lennox, SD (US)

(73) Assignee: CCL Label, Inc., Sioux Falls, SD (US)

( * ) Notice: Subject to any disclaimer, the term of this patent is extended or adjusted under 35 U.S.C. 154(b) by 127 days.

(21) Appl. No.: 09/818,960

(22) Filed: Mar. 27, 2001

(65) Prior Publication Data

US 2001/0011821 A1 Aug. 9, 2001

Related U.S. Application Data

(62) Division of application No. 09/412,881, filed on Oct. 5, 1999, now Pat. No. 6,422,605.

(51) Int. Cl.$^{7}$ .................................. B29C 49/24
(52) U.S. Cl. .................................. 156/245; 264/509
(58) Field of Search .................................. 264/509; 156/245

(56) References Cited

U.S. PATENT DOCUMENTS 4,729,864 A * 3/1988 Chang et al. ............... 156/245
4,904,324 A * 2/1990 Heider ....................... 156/214
4,991,878 A 2/1991 Cowan et al.
5,082,439 A 1/1992 Kaminski
5,238,720 A 8/1993 Volkman ..................... 428/40
5,290,616 A 3/1994 Cowan et al.
5,308,693 A 5/1994 Ryle et al.
5,344,305 A 9/1994 McKillip
5,588,239 A 12/1996 Anderson
5,711,839 A 1/1998 Dronzek, Jr.
5,860,238 A 1/1999 Anderson
5,884,421 A 3/1999 Key
5,885,408 A 3/1999 Kaminski
5,908,590 A 6/1999 Yoshimi et al.
5,919,414 A 7/1999 Dobler
6,027,598 A 2/2000 Anderson
6,035,568 A 3/2000 Grosskopf et al.
6,042,149 A 3/2000 Roshkoff

* cited by examiner

*Primary Examiner*—Suzanne E. McDowell
(74) *Attorney, Agent, or Firm*—Warner Norcross & Judd LLP

(57) ABSTRACT

An expanded content label (ECL) having multiple layers and a heat-activated adhesive. The ECL is intended for use in an in-mold labeling process. A method for applying the ECL includes placing the ECL in a mold, molding an article within the mold thereby activating the adhesive, and removing the article with the label adhered thereto from the mold.

12 Claims, 3 Drawing Sheets

IN-MOLD EXPANDED CONTENT LABEL AND METHOD FOR APPLYING SAME

This is a division of application Ser. No. 09/412,881, filed Oct. 5, 1999, now U.S. Pat. No. 6,422,605.

BACKGROUND OF THE INVENTION

The present invention relates to labels and labeling, and more particularly to in-mold labels and labeling.

In-mold labels and labeling are well known. Such labels are adhered to an article, such as a bottle, during the molding of the article. The label is placed within the cavity of a mold prior to molding, and the label adheres to the surface of the article during molding.

A typical application is in the production of blow-molded containers. A preprinted label with heat activated adhesive is placed against the inner surface of the mold cavity and held by vacuum ports in the mold. The mold is closed, and the plastic blank is heated and inflated within the mold. The hot plastic presses against the label, activating the adhesive and causing the label to be adhered to the outer surface of the newly molded container. The mold is opened and the labeled container is ejected from the mold. In-mold labels may be furnished as a stack of precut discrete labels or as a continuous web of adjacent labels joined edge to edge and subsequently cut and applied as disclosed in U.S. Pat. No. 5,344,305 to McKillip, incorporated by reference here.

Separate from in-mold labels and labeling, expanded contact labels (ECLs) are known. An ECL includes a booklet or leaflet, which includes information such as instructions, product warnings, or ingredients. The ECL is secured either directly to an article or to a base label that is in turn secured to the article. An ECL typically includes a pressure-sensitive adhesive for adhering the ECL to the article. Usually, an overlaminate is included over the booklet/leaflet to prevent inadvertent separation of the booklet/leaflet from the base label. ECLs are applied to molded articles after molding.

ECL's may be made from many materials including paper and thermoplastics. ECL's fabricated of thermoplastics are not as well suited to in-mold use as paper because of the elevated temperatures. The multiple layers of the plastic ECL are subject to different heat intensities as an article is blow molded. Specifically, the layer nearest the molded article is subjected to higher levels of heat than the layer adjacent the mold. This causes the ECL to buckle, and can even cause the layer to delaminate, rendering the label commercially and aesthetically unacceptable.

SUMMARY OF THE INVENTION

The aforementioned problems are overcome in the present invention comprising an expanded content label suitable for in-mold use. More specifically, the ECL includes a heat sensitive adhesive to enable application of the ECL in an in-mold process.

The present invention enables an ECL to be applied to an article during molding. The invention eliminates the need to apply an ECL to an article after molding. Accordingly, the manufacture of molded containers having expanded content labels is expedited with the resulting benefit of lower cost.

A second aspect of the invention is directed to a method of applying the novel expanded content label to articles during the molding of the articles. The method includes the steps of (1) placing an ECL having a heat-activated adhesive within a mold, (2) molding an article in the mold thereby activating the adhesive to adhere the ECL to the molded article, and (3) removing the labeled article from the mold.

In a third aspect of the invention, the ECL includes a protective overlaminate. The space between the base layer and the overlaminate—in which the booklet is enclosed—is substantially free of air to prevent air from expanding during the in-mold labeling process and consequently deforming or buckling the ECL.

In a fourth embodiment of the invention, the ECL includes a base label and an overlaminate that deform at different rates, so that together within the mold—where they are subjected to different temperatures—they deform at a uniform rate. For example, the base layer may be constructed from a thermoplastic that deforms due to heat at a rate faster than that at which the overlaminate material deforms. In this manner, the rates of deformation of the base layer and the overlaminate material are synchronized according to the levels of heat to which they are subjected. Accordingly, the ECL can be used in an in-mold process without unacceptable deformation of the ECL.

These and other objects, advantages, and features of the invention will be more readily understood and appreciated by reference to the detailed description of the preferred embodiment and drawings.

DETAILED DESCRIPTION OF THE PREFERRED EMBODIMENT

Figure 1:
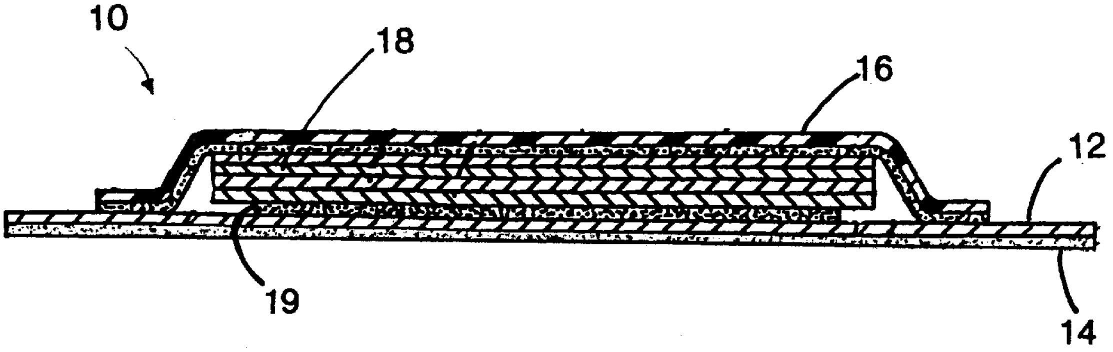
FIG. 1 is a sectional view of an expanded content label of the present invention.
Figure 2:
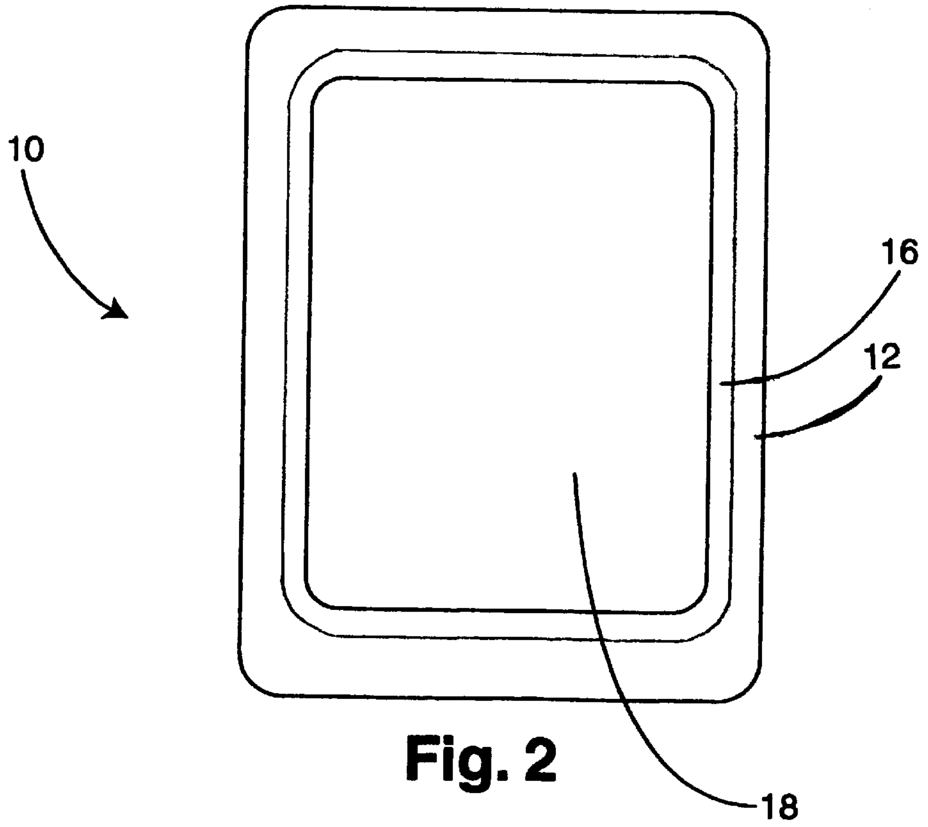
FIG. 2 is a top plan view of the expanded content label.

A preferred embodiment of the expanded content label (ECL) of the present invention is illustrated in FIGS. 1 and 2, and generally designated 10. The label includes a base layer or substrate 12, a booklet 18 adjacent the base, and a protective overlaminate or cover 16 releasably adhered to either or both of the booklet and the base. Preferably, the base layer 12, and the overlaminate 16 are constructed of paper. Alternatively, these items may be constructed of plastic or other suitable material.

The base 12 includes a linerless heat sensitive adhesive layer 14 on its undersurface. Preferably, the base 12, and the overlaminate 16 are constructed of the same material. The adhesive layer 14 may be applied to the base 12, in a variety of manners and patterns, as will be appreciated by those skilled in the art. The adhesive layer 14 is preferably made from adhesives that are responsive or activated by heat.

In alternative thermoplastic embodiments, the base layer 12 is constructed so that it is deformed by heat more effectively than the overlaminate 16 is deformed by heat, particularly in a blow mold process.

In the preferred embodiment, the booklet 18, is generally rectangular and formed as a number of pages or panels of paper or plastic stacked in an overlying relationship. The booklet 18 may be also adhered to the base layer 12 with adhesive 19, which may be opened like the pages of a book, folded open like a foldout map, or any configuration that makes viewing of the information convenient.

The overlaminate 16 overlays the booklet 18 uniformly and closely to avoid the entrapment of any substantial amount of air between the overlaminate layer 16 and the booklet 18. The absence of air pockets prevents substantial distortion or destruction of the expanded content label during the application of heat thereto in an in-mold labeling process. For example, if there were large air pockets adjacent the booklet 18, during the application of heat, these air pockets would expand, and potentially cause the overlaminate layer 16, to be disengaged from the base.

Use

Figure 3:
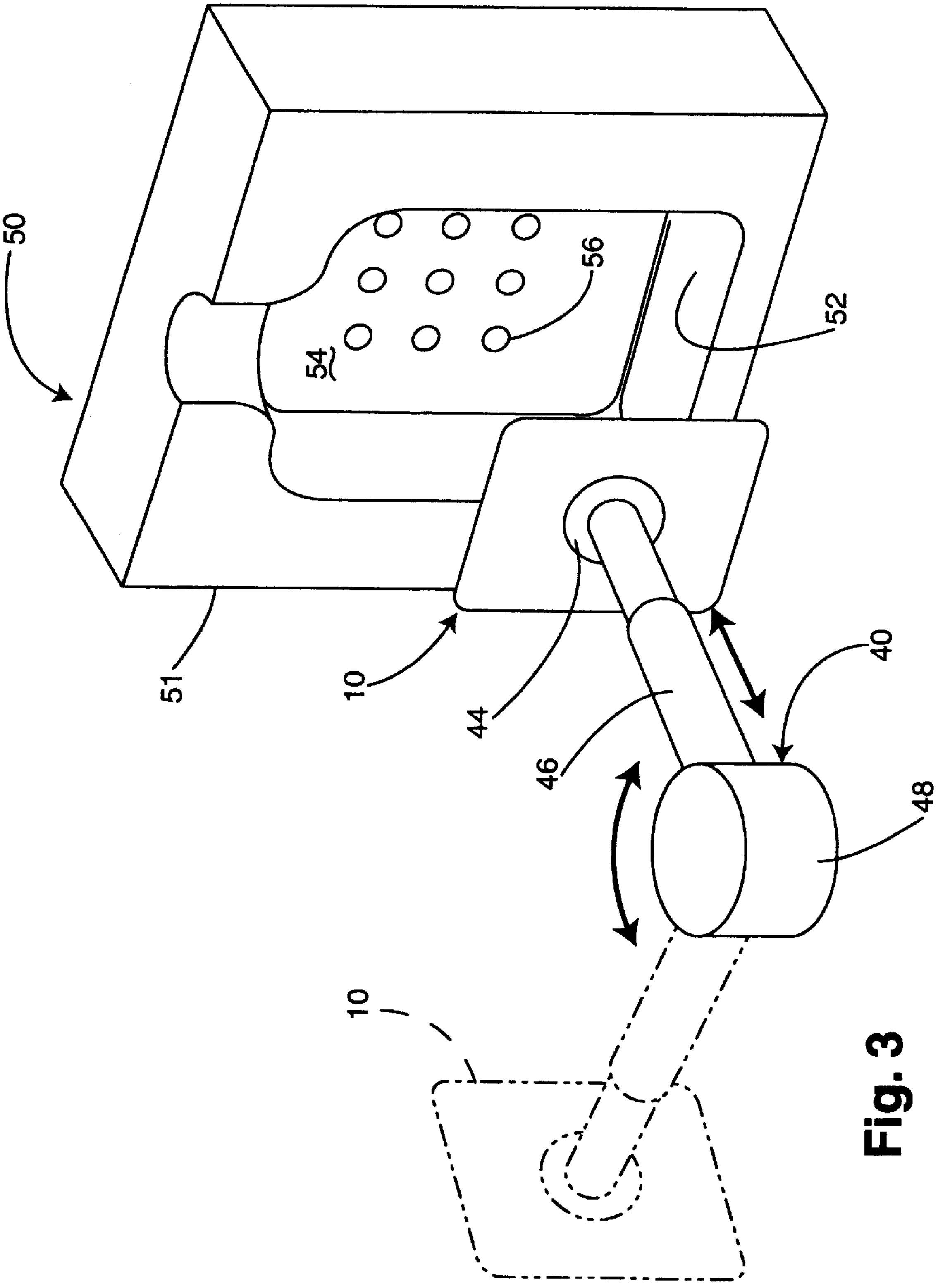
FIG. 3 is a diagrammatic perspective of the label being placed in a mold.
Figure 4:
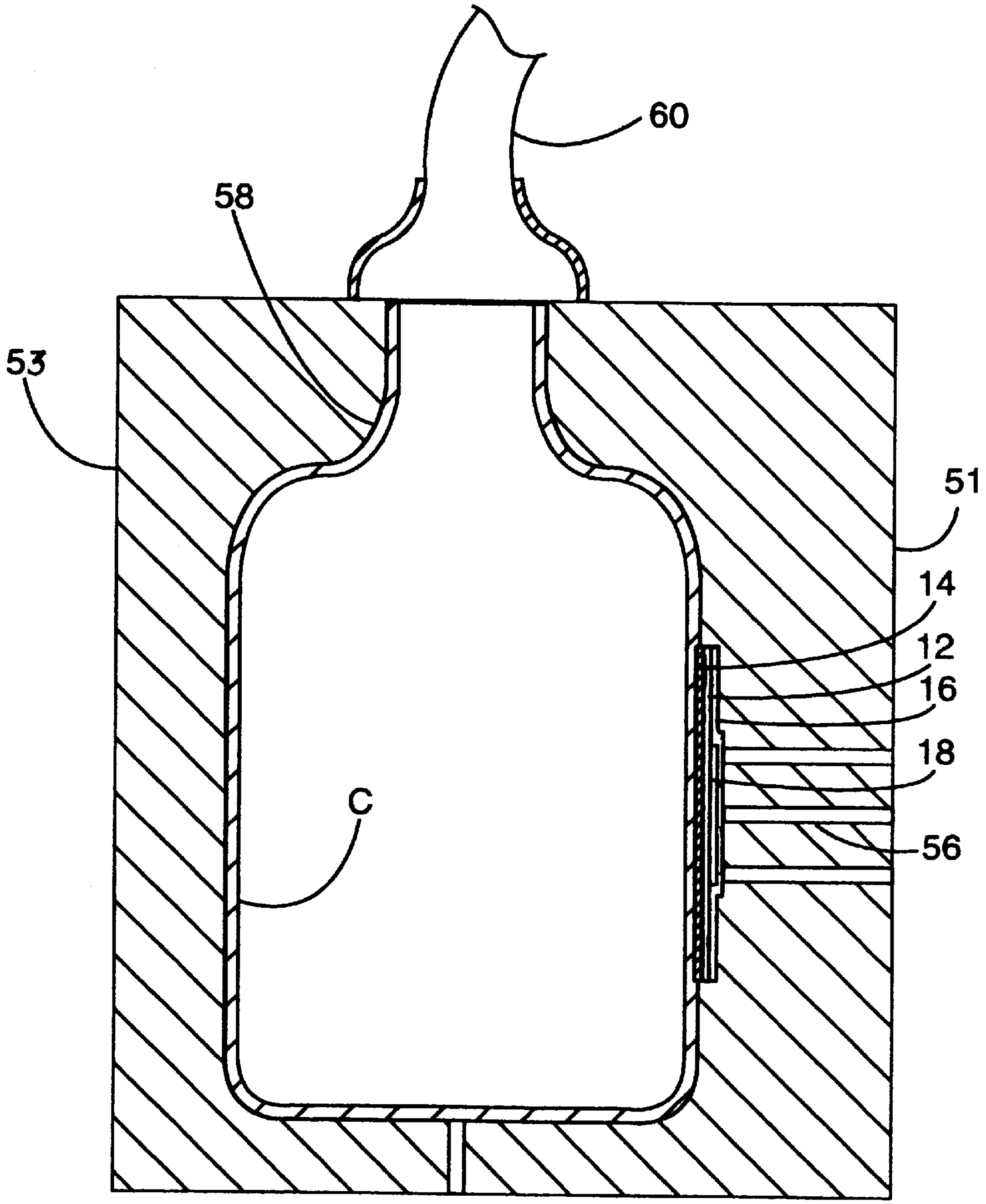
FIG. 4 is a sectional view of a blow mold and a labeled article therein.

The apparatus and method of applying ECLs to articles in an in-mold labeling process is generally illustrated in FIGS. 3 and 4. Generally included in the apparatus is a label supplying machine (not shown), a transfer device 14, and a blow mold 50. The label supplying machine may be any conventional roll or magazine supplier.

The transfer device 40 is a pick and place device including a suction cup 44 mounted at the end of a telescoping tube 46, the opposite end of the tube 46 is mounted to a pivot 48. As an alternative to a telescoping tube 46, pivot 48 may be mounted to suitable machinery which moves the pivot suction cup toward and away from the molding device 50.

As depicted in FIG. 4, the blow mold 50 includes first mold half 51 formed with a recess 52. The recess of the first mold half 50 mates with a recess of a second mold half 53 to form a cavity in which the container or article will be molded. The surface 54 of the mold recess 52 is provided with several vacuum holes 56. Vacuum holes 56 are disposed over the area of the recess in correspondence with the portion of the molded article to which the label will be adhered. A suitable source of vacuum is connected to the vacuum holes 56. Pressurized gas is supplied through tube 60.

In operation, preprinted and adhesive-coated ECLs are provided in roll, magazine, or other suitable forms (not shown) as known in the art. As shown in FIG. 3, the ECL 10 is advanced and transferred to the interior of the mold by a transfer device 40. The transfer device 40 takes a label 10, from suitable ECL supplying machinery (not shown), and transfers the ECL 10 to a mold 50. The label supplying machinery (not shown), the transfer device 14, and blow mold 50 are located in proximity to each other such that the transfer device 14 can transfer expanded content labels directly from the supplying machinery to the blow mold. Notably, any device capable of transferring the ECLs to the mold interiors may be used.

With reference to FIG. 3, when an expanded content label is advanced and provided by suitable machinery (not shown), the suction cup 44 is pivoted to a position in front of the label, the tube 46 is telescoped outwardly until the suction cup contacts the rear surface of the expanded content label, and a vacuum is delivered to 46 to suction cup such that the label is held against the suction cup. Tube 46 then withdraws such that the suction cup 44 picks the freshly cut label 36 and pivots toward the blow mold 50.

After pivoting toward the blow mold 50, tube 46 of the transfer device 14 is extended toward the first mold half 51. The suction cup 44 and the label 36 carried by the suction cup enter the recess of the mold. The front surface of the label is placed against the recess surface 54 and held in position by vacuum mold 56. The vacuum of the suction cup 44 is released and the suction cup is withdrawn from the mold half 51.

As shown in FIG. 4, second mold half 53 is closed against the first mold half 51, and a heated plastic blank is placed in the top opening 58 of the mold. The source of pressurized gas 60 inflates the blank, causing the blank to enlarge and line the mold cavity, thus forming the container C or other article. Heated plastic comes into contact with the expanded content label 10, and, in particular, the heat-sensitive adhesive exposed to the interior of the mold cavity.

As depicted in FIG. 4, the surface of the ECL 10, in particular, the base 12, the booklet 16, and the overlaminate are adhered to the container C without becoming integrated with the plastic of the container itself; however, as desired, the ECL itself; or any selected portions thereof, may be incorporated into the container. As a result, the ECL can be positioned so that its outermost surface, the overlaminate layer, is flush with the outer surface of the container. Alternatively as shown, the entire ECL may be substantially external to the container, thus having a raised configuration. While in the mold 50, the heat activates the adhesive layer 14 on the rear surface of the base 12 causing the label 10 to be adhered to the container C.

As described above, because base layer 12 is in closer proximity container C, it is constructed so that it properly shrinks from the heat generated from the blow molding process that would otherwise ruin the aesthetics of the ECL, or worse, destroy the ECL by excessively shrinking or melting the base layer. Accordingly, the expanded content label may be subjected to elevated temperatures during the process of blow molding without incurring substantial deformation.

After the expanded content label has been sufficiently adhered to the blow-molded container, the mold is opened and the consequentially labeled container is ejected from the mold.

The above description is that of a preferred embodiment of the invention. Various alterations and changes can be made without departing from the spirit and broader aspects of the invention as defined in the appended claims. Further, any reference to claim elements in the singular, for example, using the articles "a," "and," "the," or "said," is not to be construed as limiting the element to the singular. The claims are to be interpreted in accordance with the principles of patent law including the doctrine of equivalents.

The embodiments of the invention in which an exclusive property or privilege is claimed are defined as follows:

1. A method for applying an expanded content label in an in-mold labeling process, comprising the steps of:

placing an expanded content label including a base and an overlaminate, each having different heat deformation properties, a multi-sheet information unit and a heat-activated adhesive in a mold with the adhesive facing away from the mold;

molding an article within the mold so that the heat-sensitive adhesive is activated causing the expanded content label to be adhered to the article; and removing the molded article with the adhered expanded content label from the mold.

2. The method of claim 1 wherein said step of molding comprises blow molding.

3. The method of claim 1 wherein a plurality of layers cooperate together to enclose the multi-sheet information unit within the expanded content label.

4. The method of claim 3 further comprising the step of simultaneously activating the base and the overlaminate such that the expanded content label properly conforms to the surface of the article as the article is molded.

5. The method of applying an expanded content label in an in-mold labeling process comprising the steps of:

providing an expanded content label having a booklet, a heat sensitive adhesive, a base and a cover, the base and the cover having different heat deformation properties;

intermittently and individually transferring said expanded content label to the interior of a mold such that said heat sensitive adhesive faces the interior of the mold; and molding an article within said mold whereby the label in the interior of the mold adheres to the article upon activation of the heat-sensitive adhesive on the label.

6. The method of claim 5 wherein said step of molding comprises blow molding.

7. The method of claim 6 wherein said base layer includes a first surface, said heat sensitive adhesive disposed on said first surface.

8. The method of claim 7 wherein said base layer includes a second surface, said overlaminate layer releasably adhered to a portion of said second surface.

9. The method of claim 8 wherein said booklet is sandwiched between said second surface and said overlaminate layer.

10. An in-mold labeling process comprising the steps of:

positioning an expanded content label including a booklet, a base substrate and an overlaminate, the base substrate and overlaminate having different heat deformation properties, and a heat-sensitive adhesive in a mold; and molding a thermoplastic article in the mold whereby the heat-sensitive adhesive is activated and secures the expanded content label to the article.

11. The in-mold labeling process of claim 10 comprising the step of repeating said positioning and molding steps.

12. The in-mold labeling process of claim 11 wherein the booklet is sandwiched between the base substrate and the overlaminate.

* * * * *